United States Patent
Rashid

(10) Patent No.: US 10,423,581 B1
(45) Date of Patent: Sep. 24, 2019

(54) DATA STORAGE SYSTEM EMPLOYING FILE SPACE RECLAIM WITHOUT DATA MOVEMENT

(71) Applicant: EMC Corporation, Hopkinton, MA (US)

(72) Inventor: Ahsan Rashid, Edison, NJ (US)

(73) Assignee: EMC IP Holding Company LLC, Hopkinton, MA (US)

( * ) Notice: Subject to any disclaimer, the term of this patent is extended or adjusted under 35 U.S.C. 154(b) by 785 days.

(21) Appl. No.: 15/085,282

(22) Filed: Mar. 30, 2016

(51) Int. Cl.
*G06F 16/17* (2019.01)
*G06F 3/06* (2006.01)

(52) U.S. Cl.
CPC ........ *G06F 16/1727* (2019.01); *G06F 3/0608* (2013.01); *G06F 3/0647* (2013.01); *G06F 3/0652* (2013.01); *G06F 3/0683* (2013.01)

(58) Field of Classification Search
CPC .. G06F 16/1727; G06F 3/0608; G06F 3/0652; G06F 3/0683
See application file for complete search history.

(56) References Cited

U.S. PATENT DOCUMENTS

| | | | | |
|---|---|---|---|---|
| 6,330,653 | B1 * | 12/2001 | Murray | G06F 3/0605 711/173 |
| 6,487,563 | B1 * | 11/2002 | Houldsworth | G06F 12/0269 |
| 7,587,573 | B2 * | 9/2009 | Grubbs | G06F 16/10 711/173 |
| 7,761,456 | B1 * | 7/2010 | Cram | G06F 11/1435 707/754 |
| 8,156,306 | B1 * | 4/2012 | Raizen | G06F 3/0608 707/813 |
| 8,200,722 | B2 * | 6/2012 | Grubbs | G06F 16/10 707/822 |
| 8,285,758 | B1 * | 10/2012 | Bono | G06F 16/119 707/822 |
| 8,566,371 | B1 * | 10/2013 | Bono | G06F 16/119 707/822 |
| 8,745,011 | B2 * | 6/2014 | Kishi | G06F 11/106 707/692 |
| 9,122,712 | B1 * | 9/2015 | Bono | G06F 16/188 |
| 9,329,803 | B1 * | 5/2016 | Bono | G06F 3/0688 |
| 9,400,741 | B1 * | 7/2016 | Bono | G06F 12/023 |
| 9,613,053 | B1 * | 4/2017 | Shusharin | G06F 16/188 |
| 9,710,165 | B1 * | 7/2017 | Lherault | G06F 3/0608 |
| 9,778,884 | B2 * | 10/2017 | Trieu | G06F 3/0605 |
| 9,817,766 | B1 * | 11/2017 | Si | G06F 3/061 |

(Continued)

*Primary Examiner* — Robert W Beausoliel, Jr.
*Assistant Examiner* — Susan F Rayyan
(74) *Attorney, Agent, or Firm* — BainwoodHuang

(57) ABSTRACT

A data storage system operates to shrink an intermediate logical volume and lower file system upon deletion of a first upper data unit of an upper file system without moving file data on the physical storage devices. Initially, a second upper data unit of the upper file system is identified that is mapped to an end location of the intermediate logical volume. Within the lower file system, a non-end location of the volume file is re-mapped to a first location on the physical storage devices where the data of the end location of the intermediate logical volume is stored. Within the upper file system, the second upper data unit is re-mapped to the non-end location of the intermediate logical volume. Subsequently, the intermediate volume is truncated by removing the portion at the non-end location.

15 Claims, 10 Drawing Sheets

(56) References Cited

U.S. PATENT DOCUMENTS

| | | | | |
|---|---|---|---|---|
| 9,846,544 B1* | 12/2017 | Bassov | ................ | G06F 3/0617 |
| 9,916,110 B2* | 3/2018 | Walsh | ................ | G06F 3/0644 |
| 9,959,056 B2* | 5/2018 | Subramanian | ........ | G06F 3/0611 |
| 9,965,381 B1* | 5/2018 | Sahin | ................ | G06F 12/023 |
| 9,983,817 B2* | 5/2018 | Callahan | ............ | G06F 3/0604 |
| 10,007,671 B1* | 6/2018 | Bono | ................ | G06F 16/128 |
| 10,013,217 B1* | 7/2018 | Bono | ................ | G06F 3/0689 |
| 10,048,885 B1* | 8/2018 | Bono | ................ | G06F 3/0643 |
| 10,146,780 B1* | 12/2018 | Bassov | ............ | G06F 16/1727 |
| 10,235,286 B1* | 3/2019 | Yu | ................ | G06F 12/0253 |
| 10,261,717 B1* | 4/2019 | Martin | .............. | G06F 3/061 |
| 2002/0091903 A1* | 7/2002 | Mizuno | ............... | G06F 3/0605 |
| | | | | 711/154 |
| 2003/0115218 A1* | 6/2003 | Bobbitt | ................ | G06F 16/188 |
| 2004/0107222 A1* | 6/2004 | Venkatesh | ........... | G06F 11/1435 |
| 2006/0155775 A1* | 7/2006 | Yamasaki | ............... | G06F 3/061 |
| 2007/0174316 A1* | 7/2007 | Grubbs | ................ | G06F 16/10 |

* cited by examiner

DATA STORAGE SYSTEM EMPLOYING FILE SPACE RECLAIM WITHOUT DATA MOVEMENT

BACKGROUND

The present invention is related to the field of data storage systems, and in particular data storage systems employing internal file systems for managing the storage of client data.

SUMMARY

A method is disclosed of operating a data storage system having physical storage devices and one or more storage processors executing computer program instructions to define an upper file system, a lower file system, and an intermediate logical volume, wherein the intermediate logical volume is viewed as an underlying storage volume by the upper file system and stored as a volume file of the lower file system. The method is directed to shrinking the intermediate logical volume and lower file system upon deletion of a first upper data unit of the upper file system without moving file data on the physical storage devices.

The method includes identifying a second upper data unit of the upper file system mapped to an end location of the intermediate logical volume, and identifying a non-end location of the intermediate volume to which the first upper data unit is mapped. Within the lower file system, the non-end location of the volume file is re-mapped to a first location on the physical storage devices where the data of the end location of the intermediate logical volume is stored, and a second location where the first upper data unit is stored on the physical storage devices is freed. Within the upper file system, the second upper data unit is re-mapped to the non-end location of the intermediate logical volume. Subsequently, the intermediate volume is truncated by removing the portion at the end location.

By the above operation, file data being retained is logically moved away from the end of the intermediate volume and lower file system, permitting the shrinking of these structures by truncation without incurring the operational penalties associated with moving data on the underlying physical storage devices.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
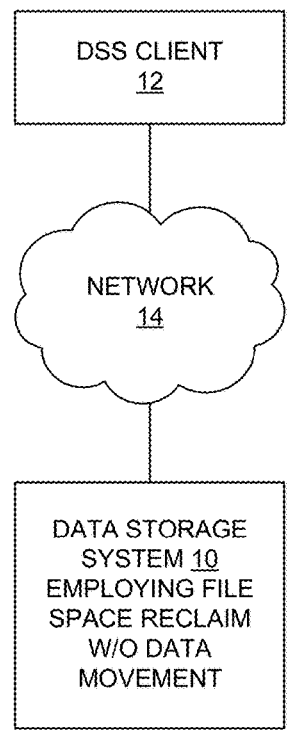
FIG. 1 is a block diagram of a computer system.

FIG. 1 shows a computer system having a data storage system 10 coupled to one or more data storage system (DSS) clients 12 by a network 14. In a typical case a DSS client 12 is a host computer such as a server computer executing one or more application programs (applications) for which the secondary storage (block or file) is maintained by the data storage system 10, with the network 14 conveying data storage requests and responses, as well as associated data. For example, a DSS client 12 performs a write operation to a block-oriented storage device by issuing a write request that specifies the device, the starting logical address, and the length, as well as the associated write data. The network 14 conveys the write request and write data to the data storage system 10, which stores the write data on the identified device beginning at the specified logical address. A DSS client 12 performs a read operation to a block-oriented device by issuing a read request that specifies the device, the starting logical address, and the length. The network 14 conveys the read request to the data storage system 10, which obtains the data from the specified device beginning at the specified logical address and returns the data to the DSS client 12 via the network 14. As explained more below, the data storage system 10 may present storage resources to the DSS clients 12 in alternative ways, such as in the form of a network-level or distributed file system, or as virtual volumes or similar virtualized storage containers that are understood by DSS clients 12 hosting virtual machines, such as ESX® hosts (servers) or XEN® hosts (servers).

As indicated at 10, the data storage system 10 employs one or more internal file systems for managing the use of storage resources, along with a technique of reclaiming file space without requiring movement of data. Details and advantages of this technique are described below.

Figure 2:
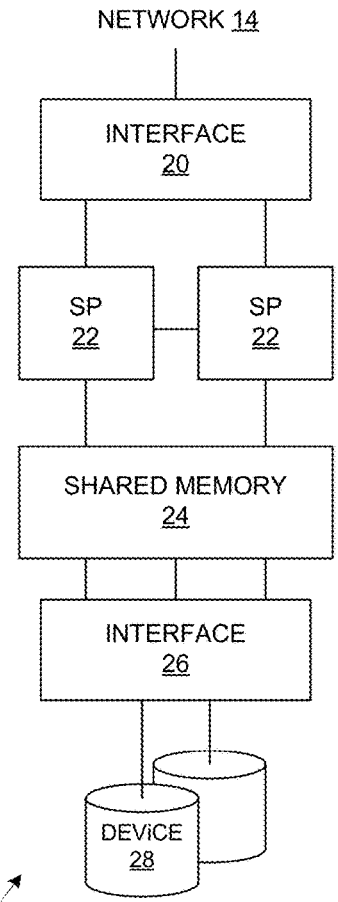
FIG. 2 is a hardware-oriented block diagram of a data storage system.

FIG. 2 is a block diagram of the data storage system 10 from a hardware perspective. It includes an interface 20 to the network 14, a pair of storage processors (SPs) 22, shared memory 24, and an interface 26 to secondary storage devices (DEVICE) 28, such as magnetic disks, Flash drives, etc. The interface 20 may include one or more network adapters such as a FibreChannel adapter, Gigabit Ethernet adapter, etc., and the interface 26 may similarly include storage-oriented adapters such as FibreChannel adapters etc. Each storage processor 22 executes software causing the storage processor 22 to present logical or virtualized storage resources to the network 14 and DSS clients 12, employing the devices 28 for the underlying physical storage. The logical or virtualized storage resources may include either or both block-oriented devices (e.g., logical storage units (LUNs), virtual volumes (VVOLS), etc.) and/or client-visible file systems (e.g., NFS, CIFS, etc.) The shared memory 24 may be used for one or more device caches, also referred to as a "storage cache", for caching data of the devices 28. Further details of the structure and operation of the data storage system 10 are provided below.

Figure 3:
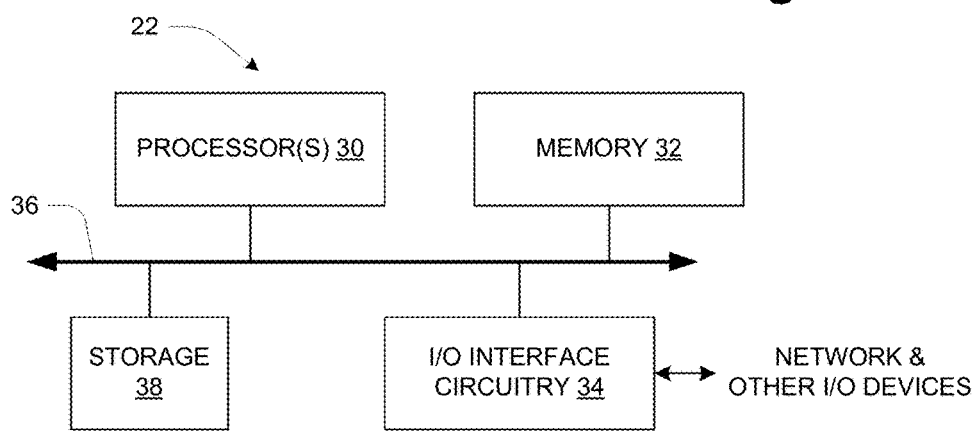
FIG. 3 is a hardware-oriented block diagram of a storage processor.

FIG. 3 shows an example configuration of a storage processor 22 from a computer hardware perspective. The hardware includes one or more processors 30, memory 32, and interface circuitry 34 interconnected together by data interconnections 36 such as one or more high-speed data buses. The interface circuitry 34 provides a hardware connections to the shared memory 24 and interfaces 20, 26 (FIG. 2) and perhaps other external devices/connections (EXT DEVs). The processor(s) 30 with connected memory 32 may also be referred to as "processing circuitry" herein. A storage processor 22 may also have its own local secondary storage 38 such as a Flash memory array. In operation, the memory 32 stores data and instructions of system software (e.g., operating system) and one or more application programs which are executed by the processor(s) 30 to cause the hardware to function in a software-defined manner.

Thus the computer hardware executing instructions of a data storage application, such as described below, can be referred to as a data storage circuit or data storage component, and it will be understood that a collection of such circuits or components can all be realized and interact with each other as one or more sets of computer processing hardware executing different computer programs as generally known in the art.

Figure 4:
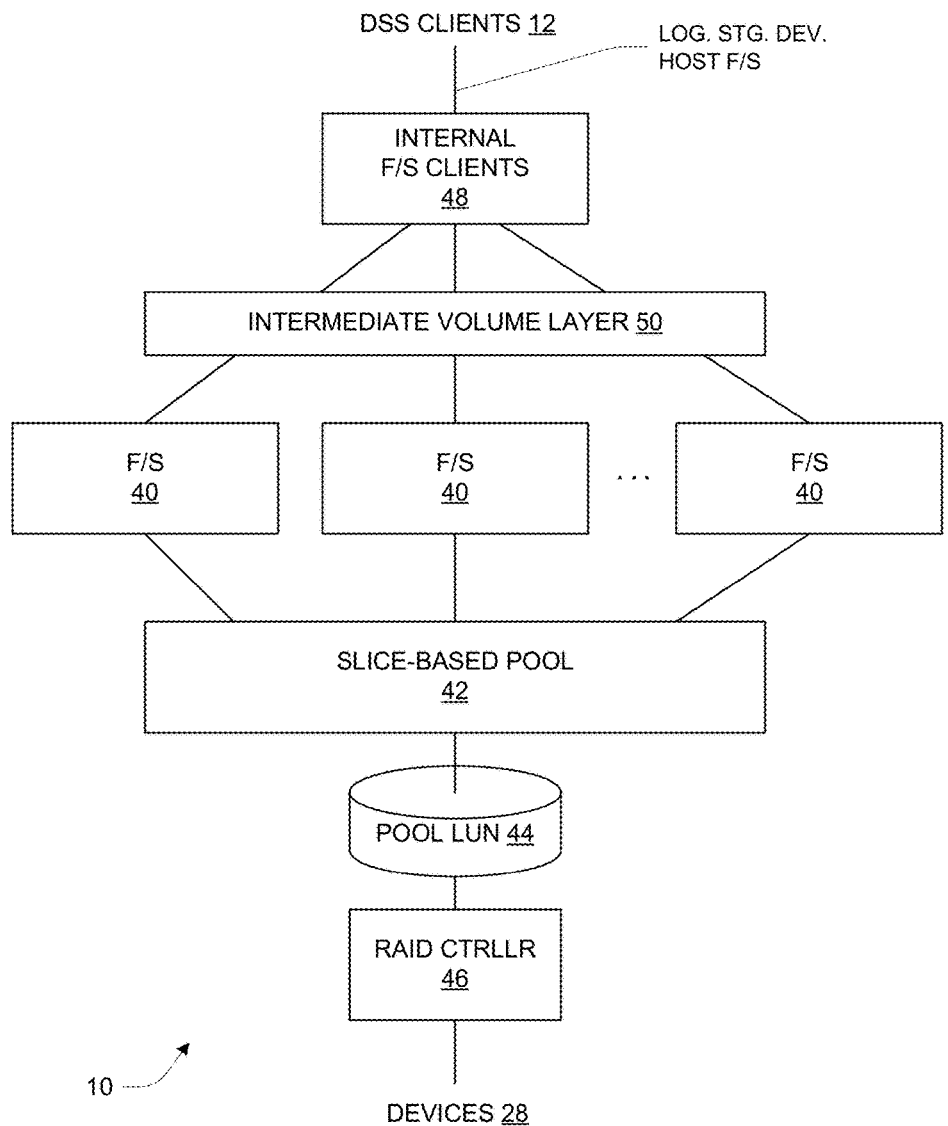
FIG. 4 is a functional block diagram of a data storage system.

FIG. 4 is a functional block diagram of the data storage system 10, the functional blocks generally being realized by execution of computer program instructions by the storage processor hardware as shown in FIG. 3. This description focuses on certain aspects of the functional structure and operation, specifically the use of one or more internal file systems (F/S) 40 which draw their underlying physical storage from the devices 28 via a certain organization as shown. This organization includes a pool 42 of data units called "slices" that are carved from an internal logical storage unit called a "pool LUN" 44, which in turn is presented by a RAID controller 46 implementing RAID over sets of the devices 28. Thus in general there may be a one-to-multiple mapping between the pool LUN 44 and corresponding devices 28 providing the RAID-protected underlying physical storage.

The internal file systems 40 are utilized by one or more internal file system clients 48 that present storage resources to the DSS clients 12. Examples of such presented resources include a logical storage device and a host file system as shown. An internal client 48 providing a host file system is referred to as a file-oriented internal client. A host-visible file system is referred to as an "upper" file system to distinguish it from the internal file system(s) 40, which are also referred to as "lower" file systems 40 herein. Logically interposed between the internal file system clients 48 and the lower file systems 40 is an intermediate logical volume (LV) layer 50 that presents logical volumes of storage to the internal file system clients 48. Each of these logical volumes, also referred to herein as "intermediate volumes", is stored in a respective file of a corresponding lower file system 40.

One of the tasks within the data storage system is to manage the use of physical storage space provided by the devices 28. In particular, the present description is directed to shrinking the size of a lower file system 40, as stored on a set of devices 28, in response to the removal or deallocation of slices from an upper file system. Due to the multiple-layer structure, slices of an upper file system can be relocated to different offsets in an intermediate volume without affecting the consistency of the upper file system as viewed by a DSS client 12. Specifically, a slice mapped to the "last" slice in the intermediate volume (i.e., the slice having the highest offset in the logical address space) can be moved to the offset of an evacuated slice, thus enabling a subsequent truncation or shrinking of the intermediate volume by removal of one or more end-most slices. This move or relocation can be done by adjusting metadata in the stack and without moving user data stored in the slices.

To provide robustness against interruptions during the moving of slices, the sub-operations should be "idempotent", i.e., always either completed in their entirety or leaving the system as though they never started. Aspects of idempotence are referred to below.

Figure 5:
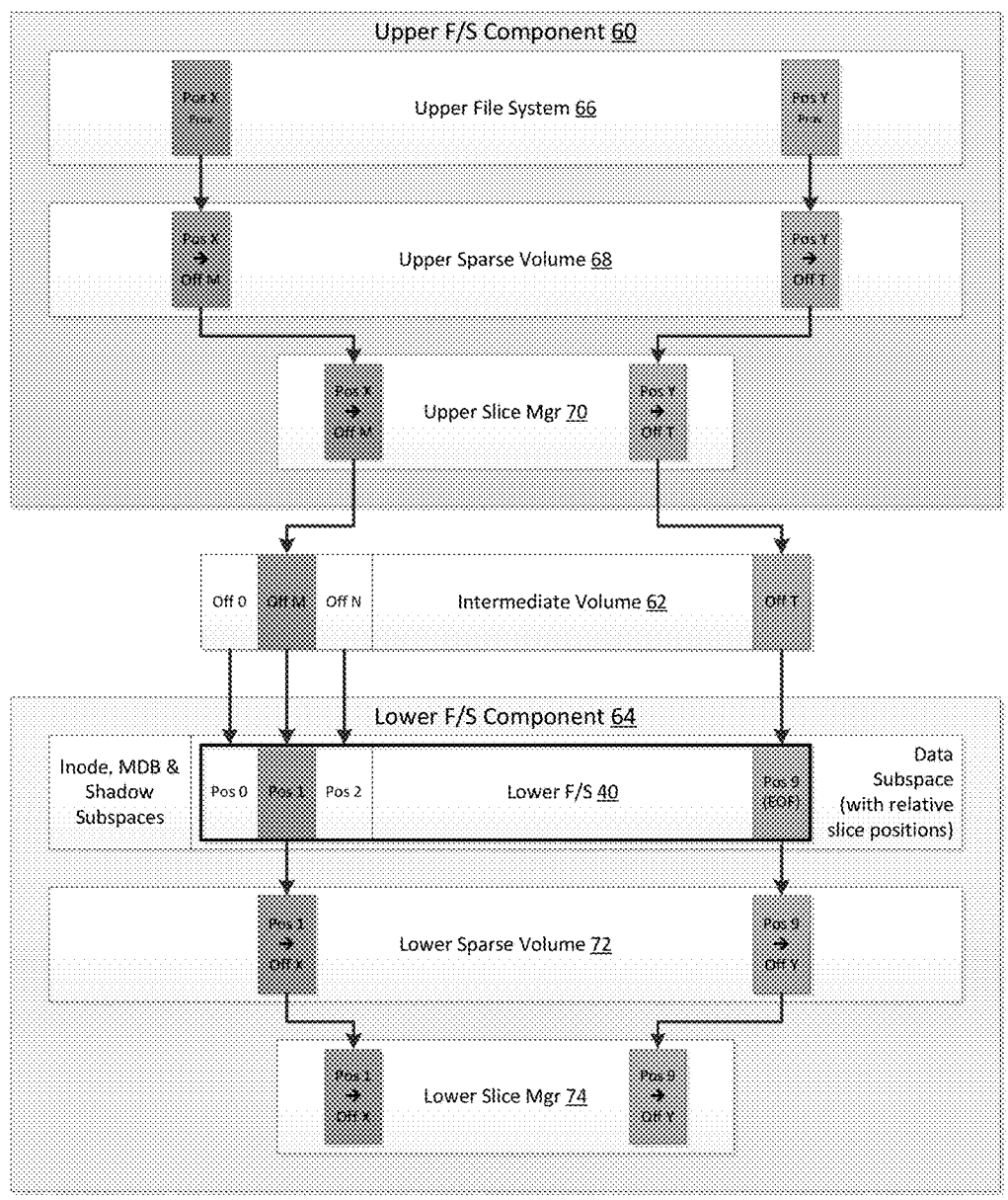
FIGS. 5 through 12 are schematic diagrams showing evolution of a multi-layer logical structure in the data storage system as part of space reclamation.

FIG. 5 shows the logical structure of an upper file system component 60, intermediate volume 62, and a lower file system component 64. This structure corresponds to the structure shown in FIG. 4 as follows: the upper file system component 60 is a file-oriented internal client 48; the intermediate volume 62 is a volume at the intermediate volume layer 50; and the lower file system component 64 contains a lower file system 40. More specifically, the upper file system component 60 includes an upper file system 66, a logical volume referred to as an upper sparse volume 68, and an upper slice manager (USM) 70. The lower file system component 64 includes a lower file system 40, a lower sparse volume 72, and a lower slice manager (LSM) 74. In both the upper and lower file system components 60, 64, the respective sparse volume 68, 72 effects a virtualization of the respective file system 66, 60, i.e., it presents a much larger logical address space that is mapped to a generally smaller physical address space.

Each component 60, 64 effectively performs two layers of mapping, in addition to the functions of the respective file system 66, 40. Each sparse volume 68, 72 maps the respective large logical address space to a respective smaller address space of an array of slices provided by the respective slice manager 70, 74. Each slice manager 70, 74 maps the respective smaller address space to another underlying address space. The USM 70 maps to a logical address space of the intermediate volume 62, while the LSM 74 maps to an address space of the pool LUN 44 (not shown in FIG. 5).

The description below refers to the following labels shown in FIG. 5 as well as later Figures. Each label is used in the description to identify a position as well as the slice occupying that position:

X, Y—Arbitrary positional slice in the upper file system 66 and sparse volume 68. Slice X is being removed, and slice Y is being remapped, in order to shrink the lower file system 40.

M, T—Offsets of slices in the intermediate volume 62 initially mapped to X and Y respectively. M is generally arbitrary; T is the offset of the last slice, i.e., the slice located at the end of the intermediate volume 62 (at the highest possible offset).

1, 9—Offsets of slice-sized areas of the lower file system 40 and lower sparse volume 72 whose positions mirror the positions of the slices at offsets M and T of the intermediate volume 62.

FIG. 5 shows a starting state in which slices at positions X and Y are provisioned in the upper file system 66. Each of these is mapped down to physical slices of a pool LUN 44 by a corresponding chain of slice metadata. The slice at position X is mapped to offset M of the intermediate volume 66, position 1 of the lower file system 40 and lower sparse volume 72, and a corresponding slice of the lower slice manager 74. Similarly, the slice at position Y is mapped to offset T of the intermediate volume 66, position 9 of the lower file system 40 and lower sparse volume 72, and a corresponding slice of the lower slice manager 74. The numerical values 1 and 9 are for illustration only and are not limiting. Offset M in the intermediate volume 62 is also arbitrary; while offset T is the last or end-most slice thereof.

Figure 6:
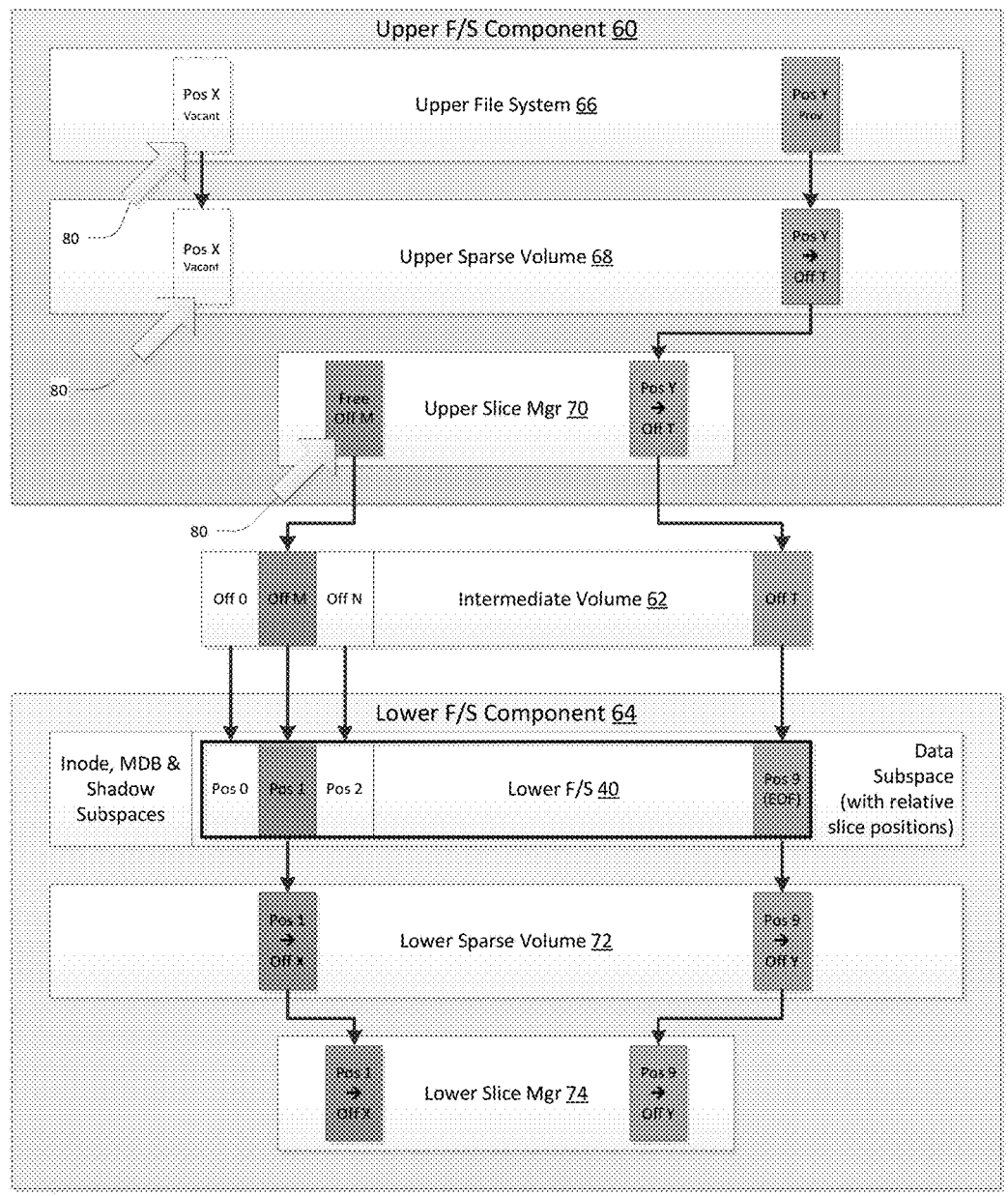

FIG. 6 shows a subsequent state after slice position X has been removed from the upper file-system 66 and sparse volume 68. Large arrows 80 are used to highlight changes from the preceding state, which in this case is the state of FIG. 5. As the slice at position X was mapped to offset M in the intermediate volume 62, slice M is now free. A slice may have been freed by operation of a reclamation process that periodically consolidates space that has been deleted by user action (e.g., a file delete operation) and then makes the consolidated space available for returning to the pool 42. Slice Y still stores user data that must be retained.

Figure 7:
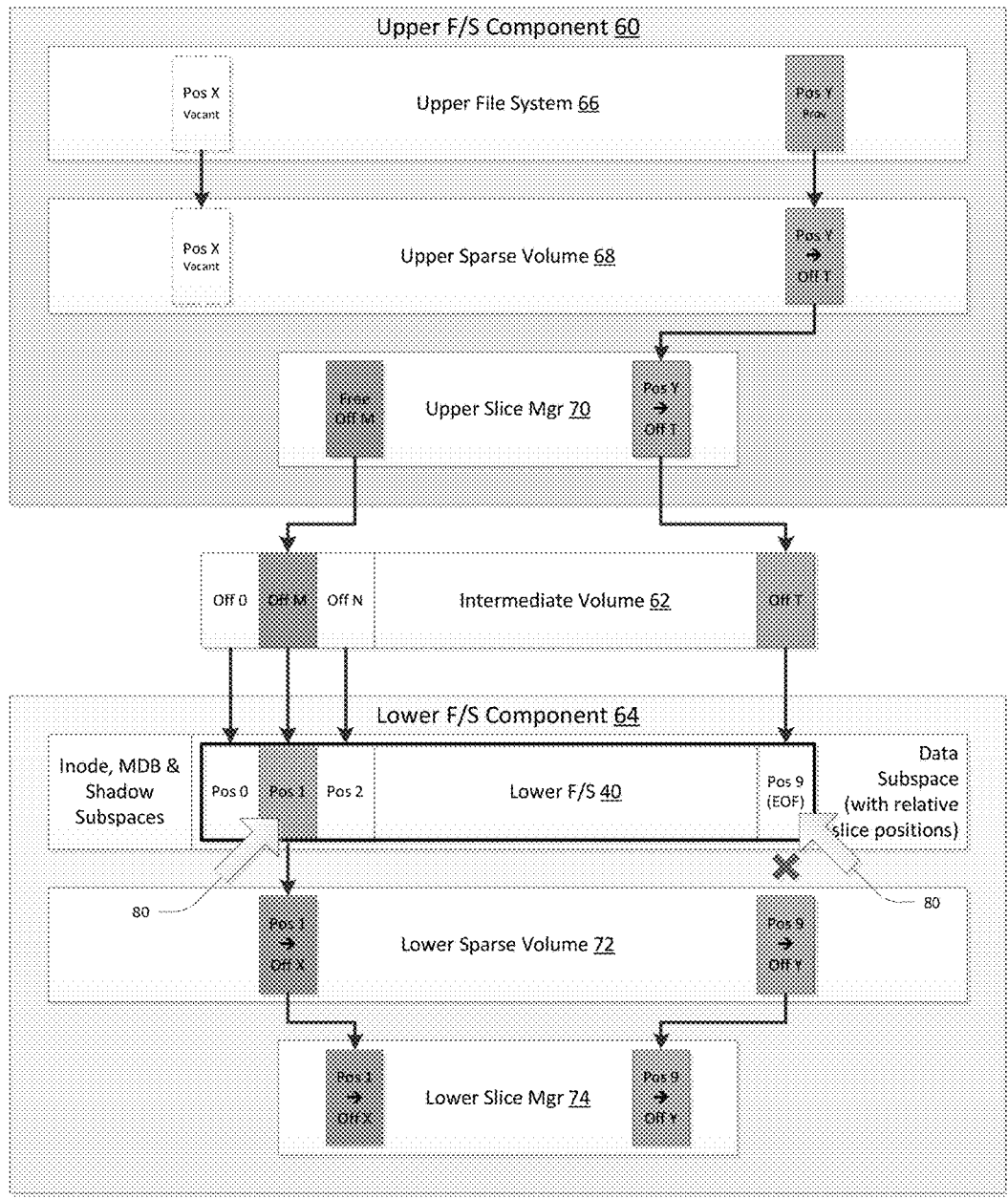
Figure 8:
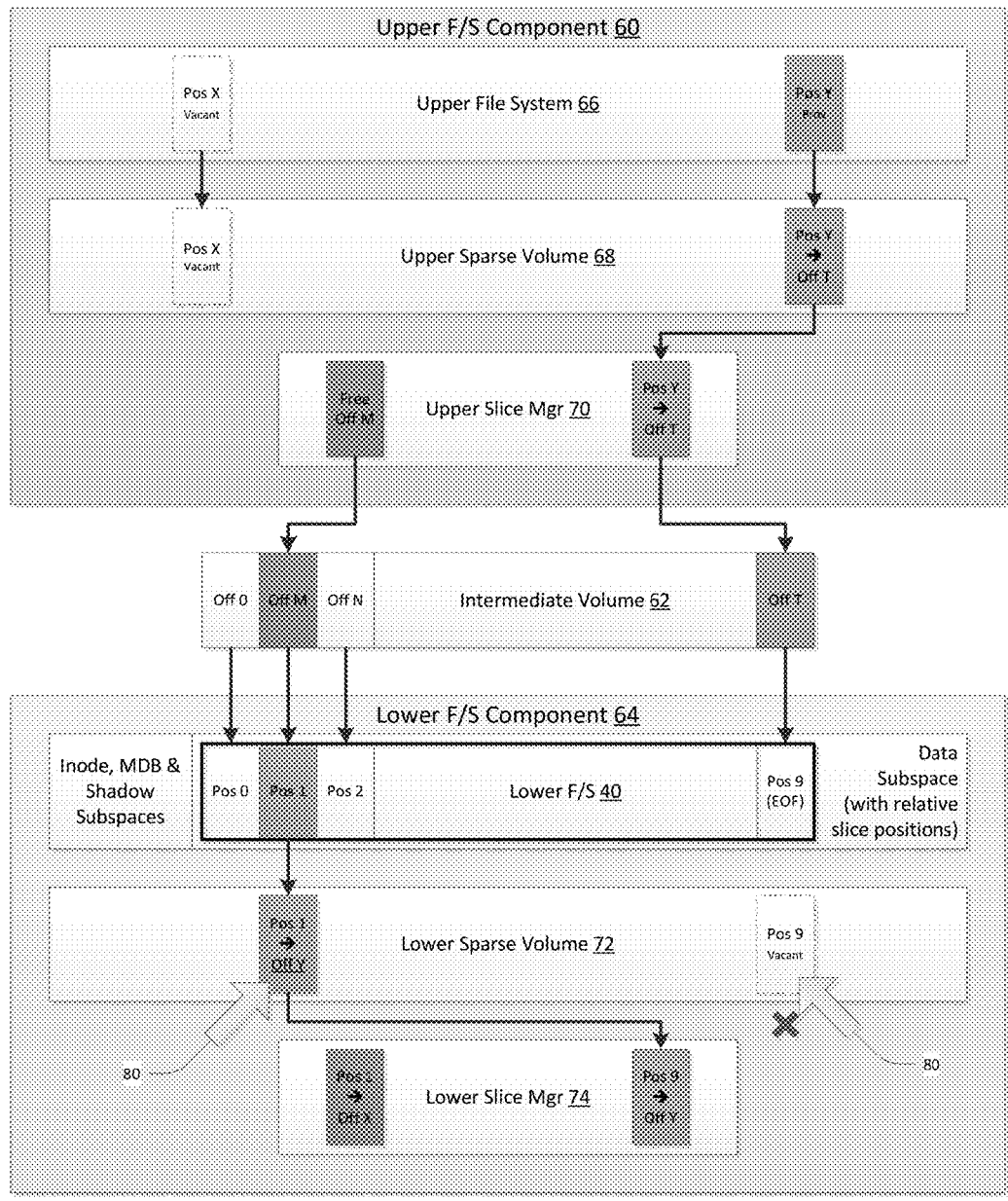
Figure 9:
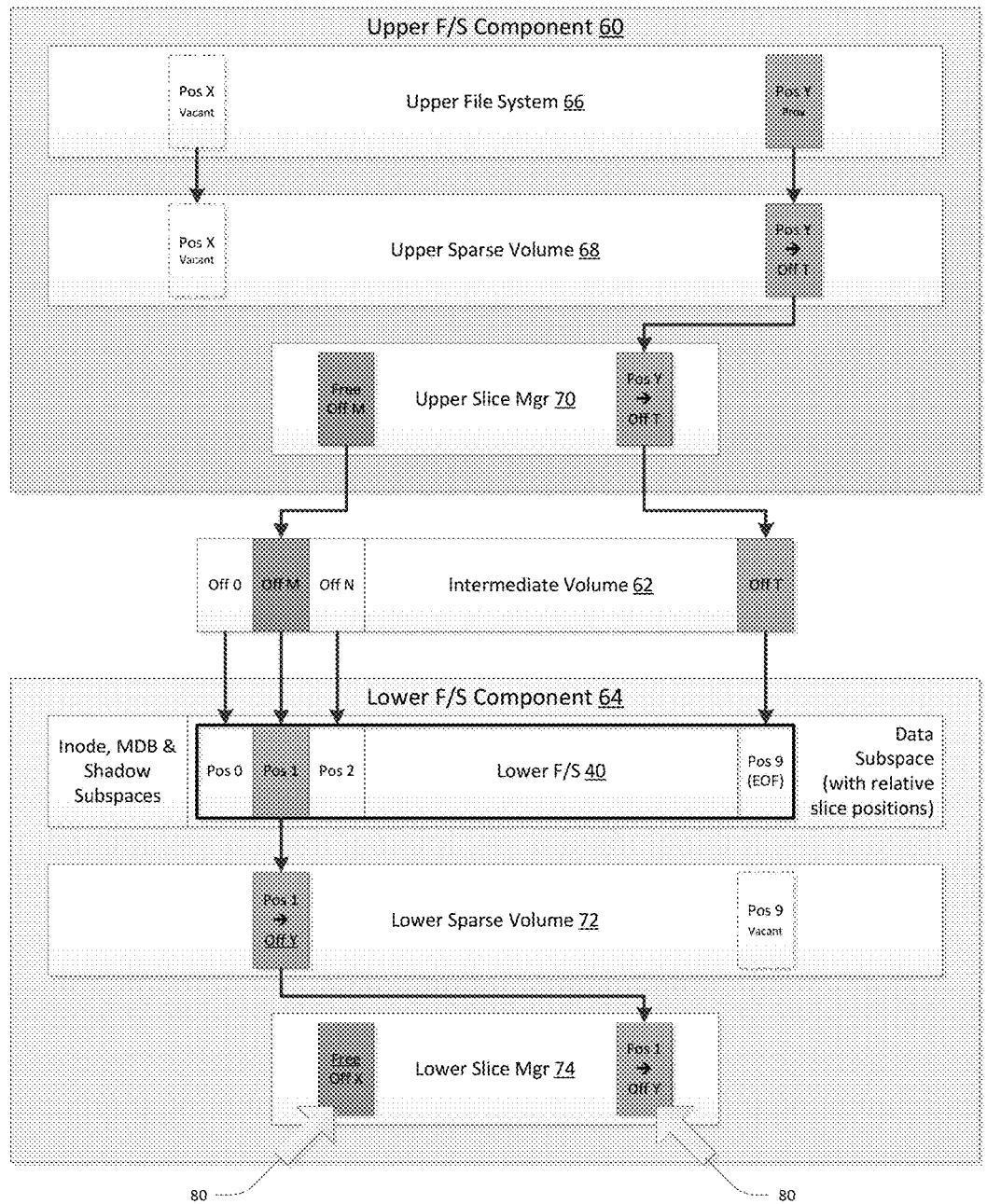
Figure 10:
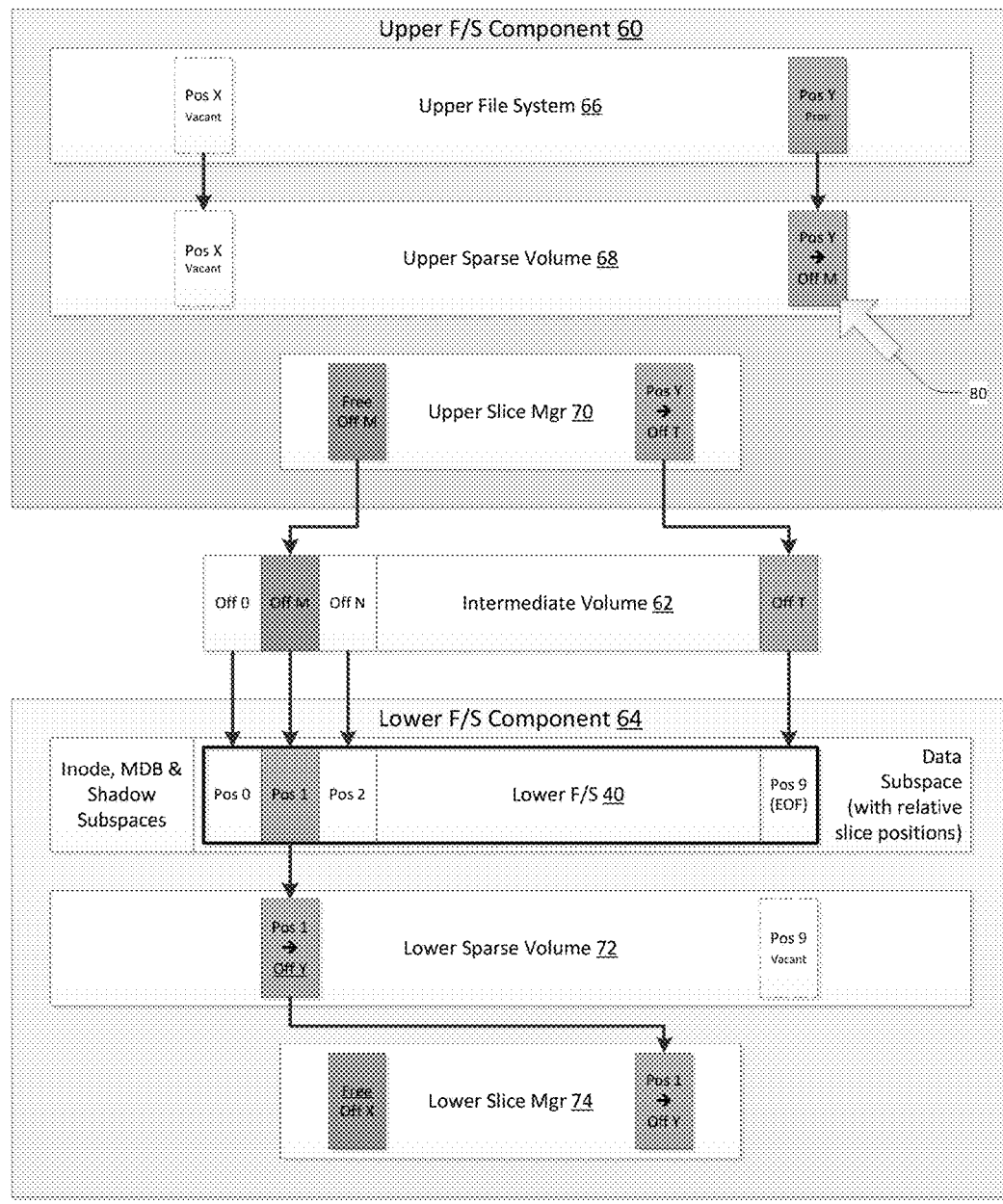
Figure 11:
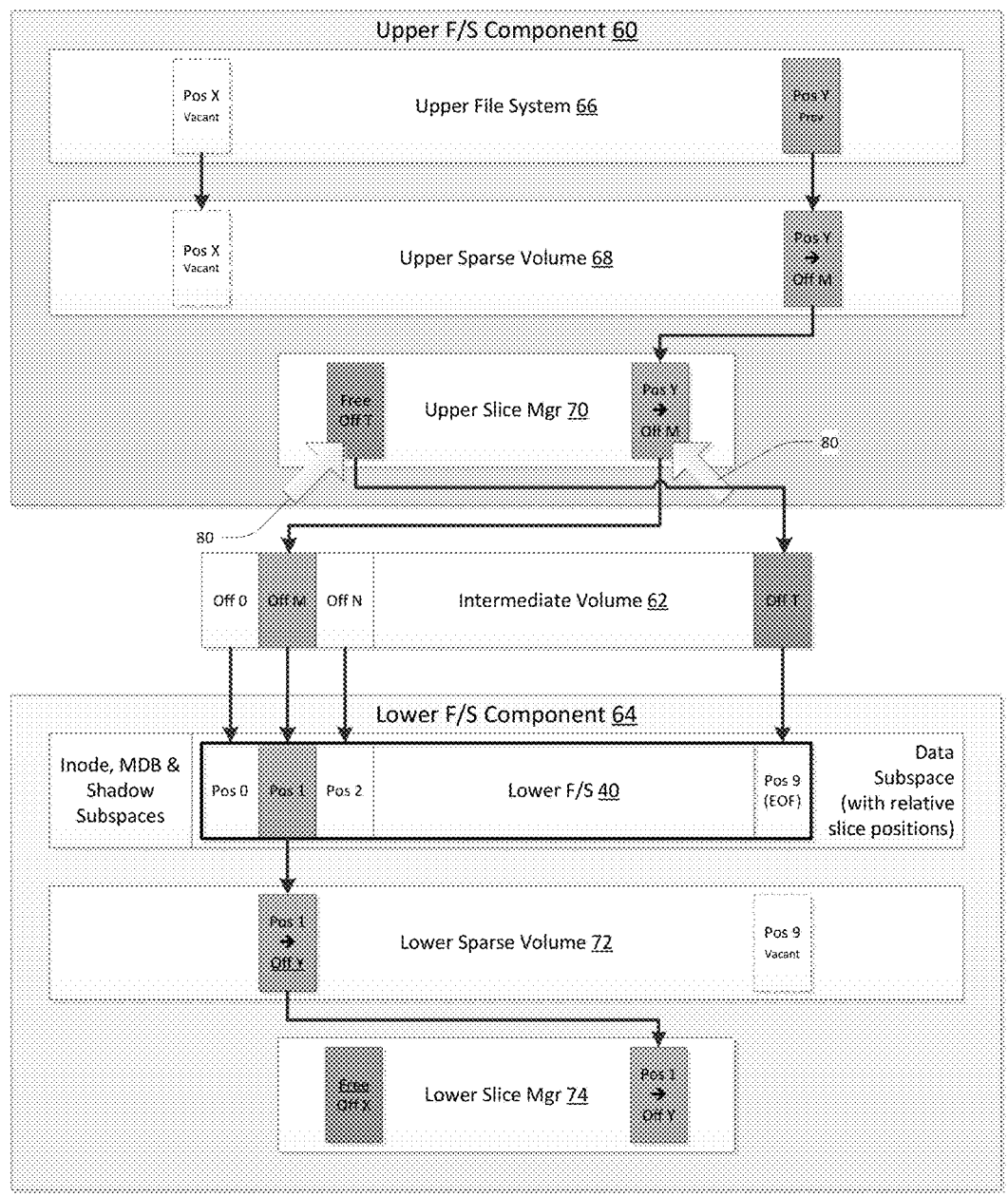
Figure 12:
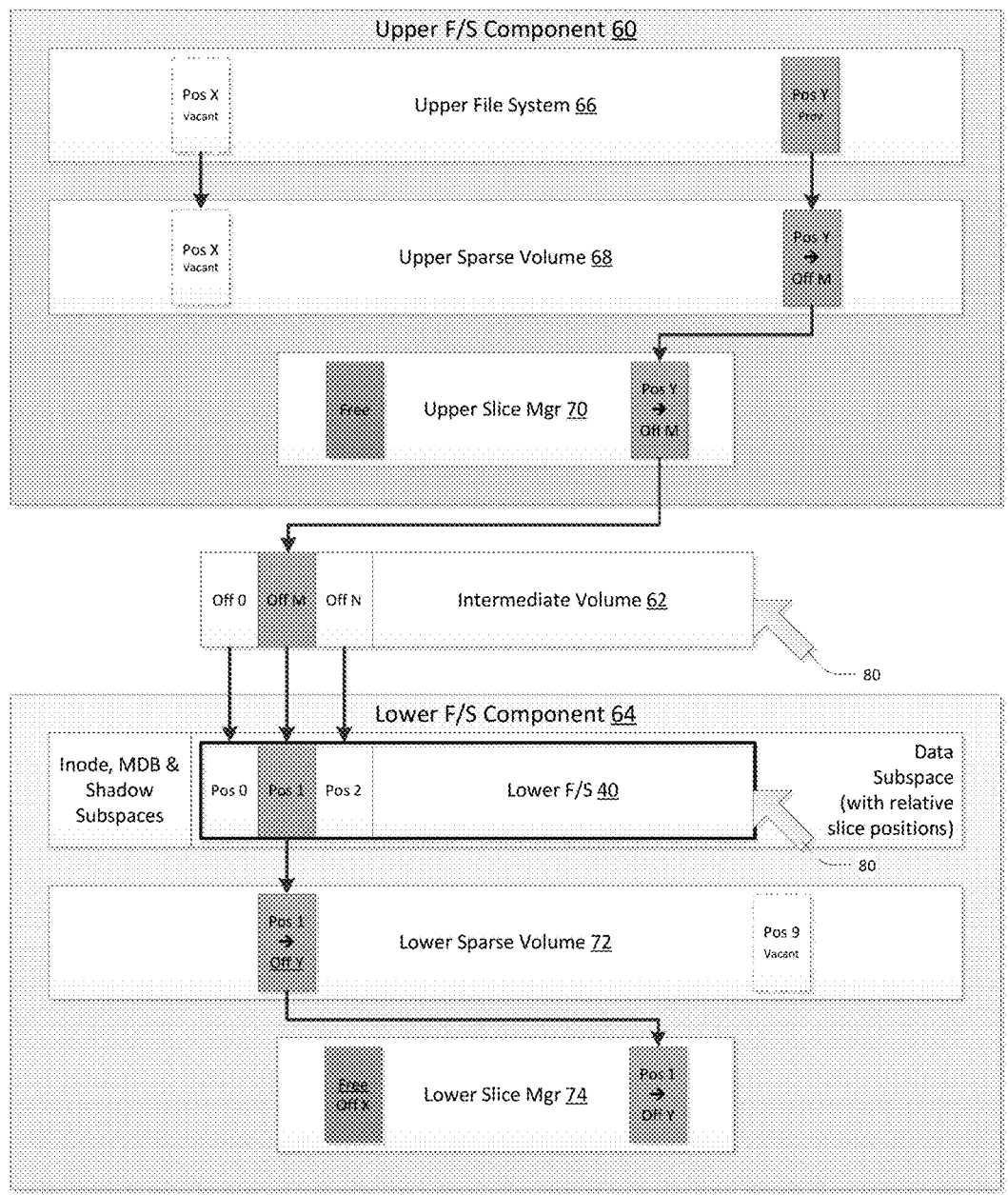

FIGS. 7 through 12 are used to illustrate subsequent steps of the process, with each figure showing the result of a corresponding process step. FIGS. 7-9 show operations occurring within the lower file system component 64; FIGS. 10-11 show operations occurring within the upper file system component 60; and FIG. 12 shows the result of a final truncation process. In these figures, all the current mappings are indicated by downward-directed arrows between components in different logical layers.

As a first step, slice Y of the upper file system 66 is locked to prevent user I/O. This is for coherence and in support of idempotence, as noted above. It is unlocked later as noted below.

FIG. 7 shows the result of a second step in which the slice at position 9 in the lower file system 40 is moved to position 1, and position 9 is removed. In this operation, moving a slice refers to moving metadata conveying the state of the slice, which can include things like cylinder group bitmaps and cylinder/slice-map counters. Thus the slice at position 1 takes on the metadata of the slice at position 9. This operation must be idempotent. The lower file system 40 can introduce a new transaction for this operation, and the removal of position 9 (for example) can indicate to the lower file system 40 whether or not the operation was successful.

FIG. 8 shows the result of a third step, in which slice position 9 of the lower sparse volume 72 is moved to position 1 and position 9 is removed. This is similar to moving a slice in the lower file system 40, i.e., it involves moving the state of the slice. In this case the state includes (device, offset) mapping to the pool LUN 44. This operation must be idempotent.

FIG. 9 shows the result of a fourth step, in which erstwhile slice X of the LSM 74 is freed, and slice Y becomes identified as mapping position 1 to offset Y. This operation associates offset Y with position 1 instead of position 9, effecting a logical movement of the slice Y data to position 1 of the lower file system 40, without physically moving the data in the pool LUN 44.

FIG. 10 shows the result of a fifth step, in which slice position Y in the upper sparse volume 68 is updated to point to the offset of the freed slice, i.e., offset M, and the corresponding slice of upper slice manager 70.

FIG. 11 shows the result of a sixth step, in which the upper slice manager 70 switches the offsets of the freed slice (erstwhile slice X) and slice Y, so that position Y now points to offset M in the intermediate volume 62. This step completes a new overall mapping from position Y of the upper file system 66 all the way down to offset Y of the pool LUN 44. At this point, slice position Y in the upper file system 66 is unlocked so that user I/O can resume.

FIG. 12 shows the result of a later step of truncating the intermediate volume 62 and lower file system 40 to remove the end-most slice (offset T and position 9).

While various embodiments of the invention have been particularly shown and described, it will be understood by those skilled in the art that various changes in form and details may be made therein without departing from the spirit and scope of the invention as defined by the appended claims.

What is claimed is:

1. A method of operating a data storage system having physical storage devices and one or more storage processors executing computer program instructions to define an upper file system, a lower file system, and an intermediate logical volume, the intermediate logical volume viewed as an underlying storage volume by the upper file system and stored as a volume file of the lower file system, the method directed to shrinking the intermediate logical volume and lower file system upon deletion of a first upper data unit of the upper file system without moving file data on the physical storage devices, comprising:

identifying a second upper data unit of the upper file system mapped to an end location of the intermediate logical volume, and identifying a non-end location of the intermediate volume to which the first upper data unit is mapped;

within the lower file system, remapping the non-end location of the volume file to a first location on the physical storage devices where the data of the end location of the intermediate logical volume is stored, and freeing a second location on the physical storage devices where the first upper data unit is stored;

within the upper file system, remapping the second upper data unit to the non-end location of the intermediate logical volume; and subsequently truncating the intermediate volume by removing the portion at the non-end location.

2. The method of claim 1, wherein the lower file system is part of a lower file system component including a lower sparse volume and a lower slice manager, the lower sparse volume presenting a large virtual address space to the lower file system and mapping the large virtual address space to a logical address space of a set of slices provided by the lower slice manager, the lower slice manager mapping the logical address space to a physical address space of the storage devices, and wherein remapping the non-end location of the volume file and freeing the second location on the physical storage devices includes (1) in the lower file system, moving the slice at an end position corresponding to the end location to a non-end position corresponding to the non-end location, (2) in the lower sparse volume, moving a slice at a first position corresponding to the end position to a second position corresponding to the non-end position, and (3) in the lower slice manger, identifying a slice containing the second upper data unit as being mapped from the first position of the lower slice manager, effecting a logical movement of the second upper data unit to the non-end position of the lower file system without physically moving the data in the pool LUN.

3. The method of claim 2, wherein moving a slice comprises moving metadata conveying the state of the slice, and is performed in an idempotent manner.

4. The method of claim 1, wherein the upper file system is part of an upper file system component including an upper sparse volume and an upper slice manager, the upper sparse volume presenting a large virtual address space to the upper file system and mapping the large virtual address space to a logical address space of a set of slices provided by the upper slice manager, the upper slice manager mapping the logical address space to an address space of the intermediate volume, and wherein remapping the second upper data unit to the non-end location includes (1) in the upper sparse volume, updating a first slice position for the second upper data unit to point to an offset of the freed slice in the upper slice manager, and (2) in the upper slice manager, switching the offsets of the freed slice and a slice for the second upper data unit, so that slice for the second upper data unit points to the non-end location in the intermediate volume.

5. The method of claim 1, further including:

prior to the remapping within the lower file system and the remapping within the upper file system, locking the second upper data unit to prevent user I/O thereto;

maintaining the locking of the second upper data unit throughout the remapping within the lower file system and the remapping within the upper file system; and subsequent to the remapping within the lower file system and the remapping within the upper file system, unlocking the second upper data unit to allow user I/O thereto.

6. A data storage system, comprising:
    physical storage devices;
    respective interfaces to the physical storage devices and to a network via which client storage requests are received; and
    one or more storage processors coupled to the physical storage devices and to the network via the respective interfaces, the storage processors configured and operative to perform a method including:
        defining an upper file system, a lower file system, and an intermediate logical volume, the intermediate logical volume viewed as an underlying storage volume by the upper file system and stored as a volume file of the lower file system, the method directed to shrinking the intermediate logical volume and lower file system upon deletion of a first upper data unit of the upper file system without moving file data on the physical storage devices;
        identifying a second upper data unit of the upper file system mapped to an end location of the intermediate logical volume, and identifying a non-end location of the intermediate volume to which the first upper data unit is mapped;
        within the lower file system, remapping the non-end location of the volume file to a first location on the physical storage devices where the data of the end location of the intermediate logical volume is stored, and freeing a second location on the physical storage devices where the first upper data unit is stored;
        within the upper file system, remapping the second upper data unit to the non-end location of the intermediate logical volume; and
        subsequently truncating the intermediate volume by removing the portion at the non-end location.

7. The data storage system of claim 6, wherein the lower file system is part of a lower file system component including a lower sparse volume and a lower slice manager, the lower sparse volume presenting a large virtual address space to the lower file system and mapping the large virtual address space to a logical address space of a set of slices provided by the lower slice manager, the lower slice manager mapping the logical address space to a physical address space of the storage devices, and wherein remapping the non-end location of the volume file and freeing the second location on the physical storage devices includes (1) in the lower file system, moving the slice at an end position corresponding to the end location to a non-end position corresponding to the non-end location, (2) in the lower sparse volume, moving a slice at a first position corresponding to the end position to a second position corresponding to the non-end position, and (3) in the lower slice manger, identifying a slice containing the second upper data unit as being mapped from the first position of the lower slice manager, effecting a logical movement of the second upper data unit to the non-end position of the lower file system without physically moving the data in the pool LUN.

8. The data storage system of claim 7, wherein moving a slice comprises moving metadata conveying the state of the slice, and is performed in an idempotent manner.

9. The data storage system of claim 6, wherein the upper file system is part of an upper file system component including an upper sparse volume and an upper slice manager, the upper sparse volume presenting a large virtual address space to the upper file system and mapping the large virtual address space to a logical address space of a set of slices provided by the upper slice manager, the upper slice manager mapping the logical address space to an address space of the intermediate volume, and wherein remapping the second upper data unit to the non-end location includes (1) in the upper sparse volume, updating a first slice position for the second upper data unit to point to an offset of the freed slice in the upper slice manager, and (2) in the upper slice manager, switching the offsets of the freed slice and a slice for the second upper data unit, so that slice for the second upper data unit points to the non-end location in the intermediate volume.

10. The data storage system of claim 6, wherein the method performed by the storage processors further includes:
    prior to the remapping within the lower file system and the remapping within the upper file system, locking the second upper data unit to prevent user I/O thereto;
    maintaining the locking of the second upper data unit throughout the remapping within the lower file system and the remapping within the upper file system; and
    subsequent to the remapping within the lower file system and the remapping within the upper file system, unlocking the second upper data unit to allow user I/O thereto.

11. A non-transitory computer-readable medium storing computer program instructions, the instructions being executable by a set of one or more storage processors of a data storage system to cause the data storage system to perform a method including:
    defining an upper file system, a lower file system, and an intermediate logical volume, the intermediate logical volume viewed as an underlying storage volume by the upper file system and stored as a volume file of the lower file system, the method directed to shrinking the intermediate logical volume and lower file system upon deletion of a first upper data unit of the upper file system without moving file data on the physical storage devices;
    identifying a second upper data unit of the upper file system mapped to an end location of the intermediate logical volume, and identifying a non-end location of the intermediate volume to which the first upper data unit is mapped;
    within the lower file system, remapping the non-end location of the volume file to a first location on the physical storage devices where the data of the end location of the intermediate logical volume is stored, and freeing a second location on the physical storage devices where the first upper data unit is stored;
    within the upper file system, remapping the second upper data unit to the non-end location of the intermediate logical volume; and
    subsequently truncating the intermediate volume by removing the portion at the non-end location.

12. The non-transitory computer-readable medium of claim 11, wherein the lower file system is part of a lower file system component including a lower sparse volume and a lower slice manager, the lower sparse volume presenting a large virtual address space to the lower file system and mapping the large virtual address space to a logical address space of a set of slices provided by the lower slice manager, the lower slice manager mapping the logical address space to a physical address space of the storage devices, and wherein remapping the non-end location of the volume file and freeing the second location on the physical storage devices includes (1) in the lower file system, moving the slice at an end position corresponding to the end location to a non-end position corresponding to the non-end location, (2) in the lower sparse volume, moving a slice at a first position corresponding to the end position to a second position corresponding to the non-end position, and (3) in the lower slice manger, identifying a slice containing the second upper data unit as being mapped from the first position of the lower slice manager, effecting a logical movement of the second upper data unit to the non-end position of the lower file system without physically moving the data in the pool LUN.

13. The non-transitory computer-readable medium of claim 12, wherein moving a slice comprises moving metadata conveying the state of the slice, and is performed in an idempotent manner.

14. The non-transitory computer-readable medium of claim 11, wherein the upper file system is part of an upper file system component including an upper sparse volume and an upper slice manager, the upper sparse volume presenting a large virtual address space to the upper file system and mapping the large virtual address space to a logical address space of a set of slices provided by the upper slice manager, the upper slice manager mapping the logical address space to an address space of the intermediate volume, and wherein remapping the second upper data unit to the non-end location includes (1) in the upper sparse volume, updating a first slice position for the second upper data unit to point to an offset of the freed slice in the upper slice manager, and (2) in the upper slice manager, switching the offsets of the freed slice and a slice for the second upper data unit, so that slice for the second upper data unit points to the non-end location in the intermediate volume.

15. The non-transitory computer-readable medium of claim 11, wherein the method performed by the storage processors further includes:

prior to the remapping within the lower file system and the remapping within the upper file system, locking the second upper data unit to prevent user I/O thereto;

maintaining the locking of the second upper data unit throughout the remapping within the lower file system and the remapping within the upper file system; and subsequent to the remapping within the lower file system and the remapping within the upper file system, unlocking the second upper data unit to allow user I/O thereto.

* * * * *